April 23, 1957　　F. T. AGRICOLA　　2,789,713
BOAT TRAILER
Filed Sept. 10, 1956　　2 Sheets-Sheet 2
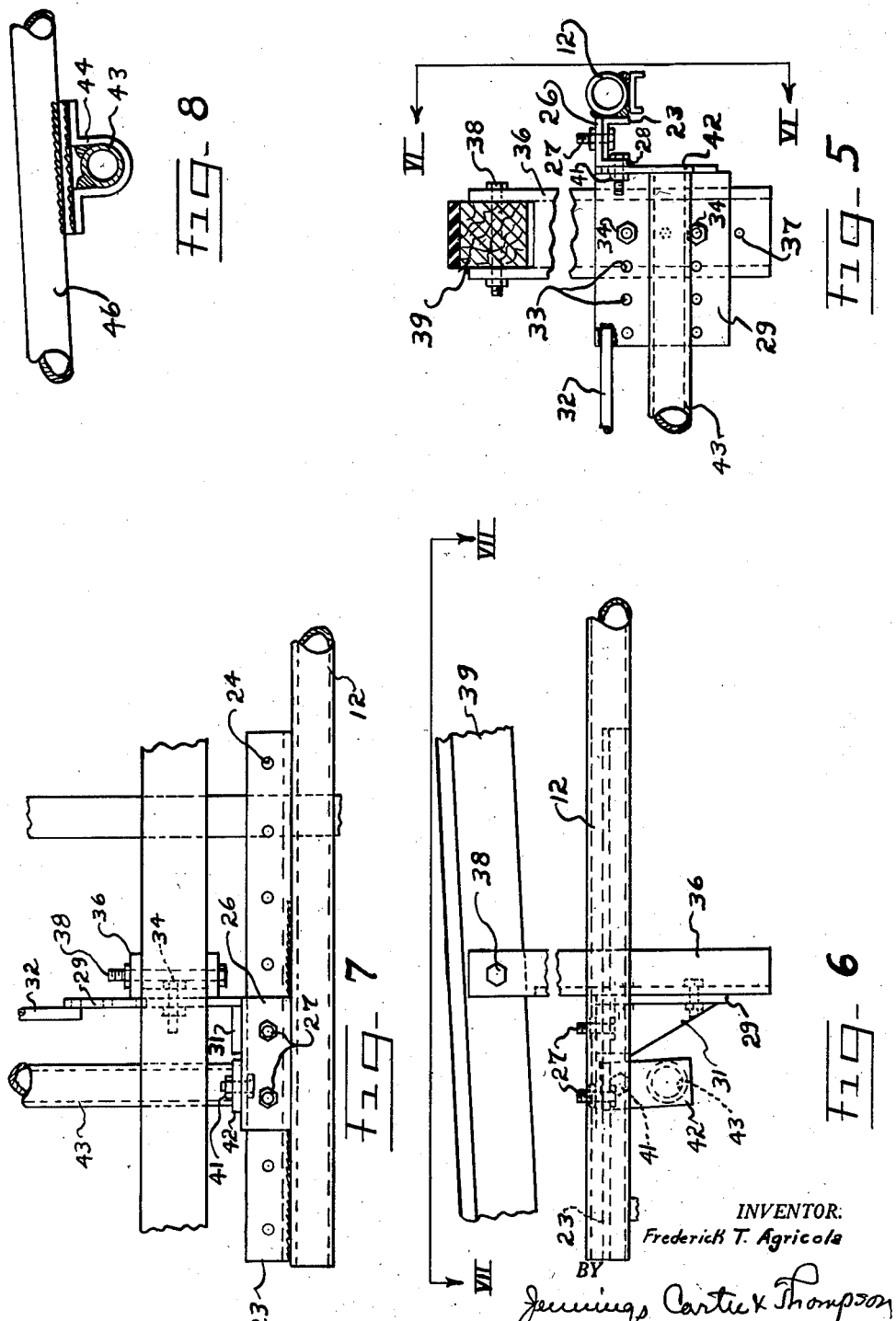
INVENTOR:
Frederick T. Agricola
BY
Jennings Carter & Thompson
Attorneys

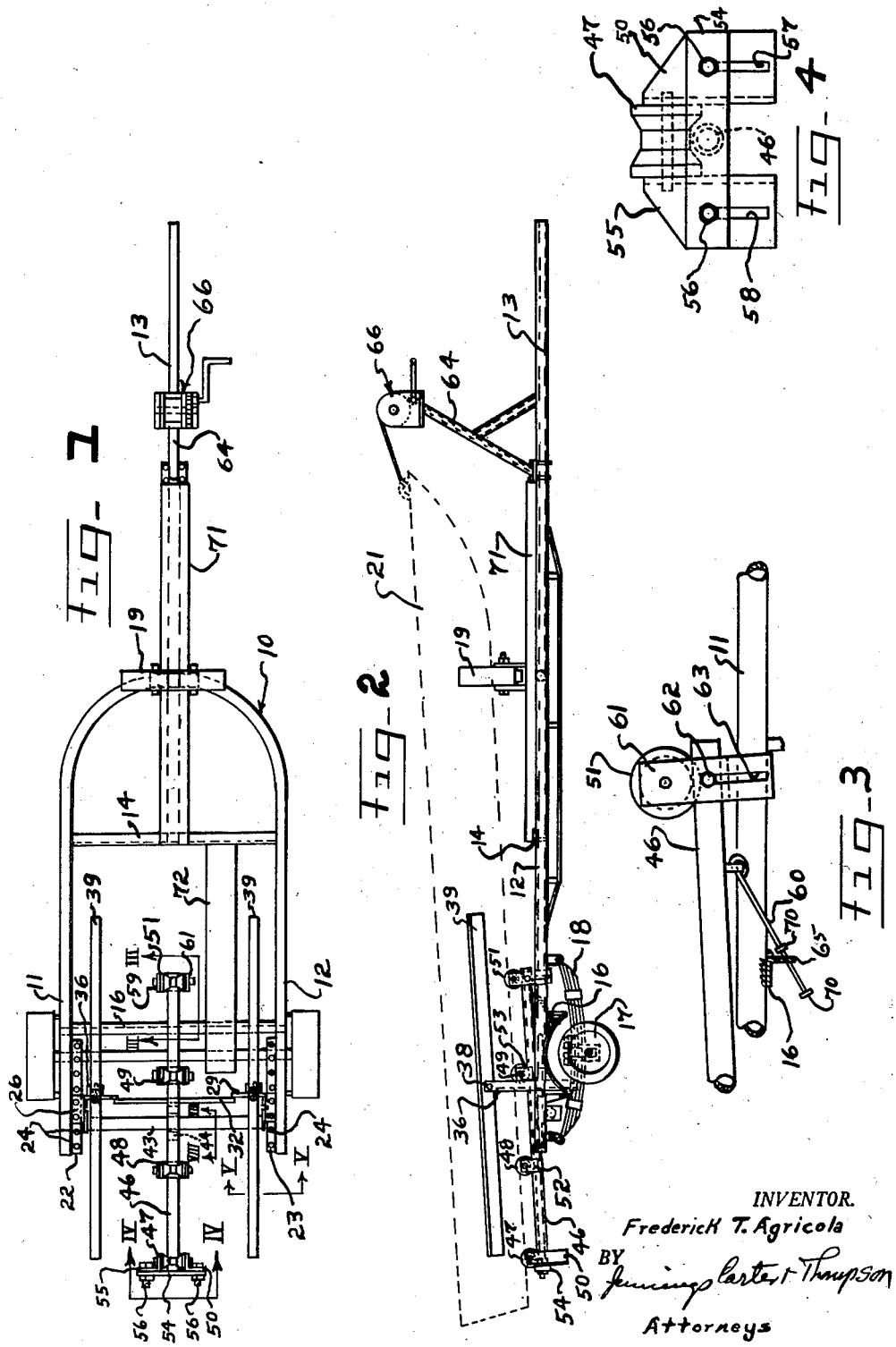

United States Patent Office 2,789,713
Patented Apr. 23, 1957

2,789,713

BOAT TRAILER

Frederick T. Agricola, Gadsden, Ala., assignor to Agricola Furnace Company, a corporation of Alabama Application September 10, 1956, Serial No. 608,767

5 Claims. (Cl. 214—505)

This invention relates to a trailer for hauling boats and has for an object the provision of a vehicle of the character designated which shall embody improved means for supporting a boat, improved means for loading a boat on the trailer, and improved means whereby a person using the trailer may handle a boat being loaded or unloaded with ease.

Another object of my invention is to provide a boat trailer with a frame having lateral supporting pads adjustable to proper supporting position longitudinally and transversely of the frame and which adapt themselves to the contour of the boat, together with separate adjustable supporting means for the bottom of the boat, thereby providing the maximum area of engagement of a boat by the supporting means.

Still another object of my invention is to provide a boat trailer which shall embody walkways so positioned as to facilitate loading a boat on, or unloading a boat from the trailer.

Briefly, my invention comprises the usual boat trailer frame with supporting wheels near the rear. Mounted on the frame, toward the rear thereof, is a longitudinally adjustable bracket assembly which supports the boat-engaging, or cradle portion of the trailer. Mounted on the bracket assembly and adjustable vertically and transversely thereof are two pad supports which extend upwardly and have pivotally mounted thereon elongated pads in position to engage the side of a boat. Also included in the bracket assembly is a transverse bar which is pivotally mounted in the bracket assembly and which has mounted thereon, midway between the side frame members, an elongated roller support bar having a plurality of sets of supporting rollers mounted thereon, in spaced relation, with the front and rear rollers adjustable vertically, whereby to accommodate themselves to the rake of the boat and engage the bottom of the boat at a plurality of places. A supporting pad for the front of the boat is provided near the forward end of the frame and a walkway is mounted on the draw bar of the trailer and extends rearwardly of the frame. A second walkway is mounted laterally of the frame and rearwardly of the first mentioned walkway whereby a person unloading a boat from or loading a boat on the trailer may do so conveniently without stepping in the water.

These and other features of my invention are illustrated in the accompanying drawings forming a part of this application in which:

Fig. 1 is a plan view;

Fig. 2 is a side elevation;

Fig. 3 is a fragmentary sectional view taken along the line III—III of Fig. 1;

Fig. 4 is an end elevational view of the roller support bar looking in the direction of the arrow IV—IV of Fig. 1;

Fig. 5 is a fragmentary sectional view taken along the line V—V of Fig. 1;

Fig. 6 is a detail side elevation looking in the direction of the line VI—VI of Fig. 5;

Fig. 7 is a detail plan view, partly in section, looking in the direction of the line VII—VII of Fig. 6; and, Fig. 8 is a sectional view taken in the direction of the line VIII—VIII of Fig. 1.

Referring now to the drawings for a better understanding of my invention my improved boat trailer embodies a U-shaped frame 10 having side frame members 11 and 12. A draw bar 13 is joined to the forward end of the frame and connects to a cross brace 14 which joins the side members 11 and 12 forwardly of the frame. A second cross brace 16 joins the side members 11 and 12 rearwardly of the frame. The trailer is supported by wheels 17 and the usual springs 18. A supporting pad, or cradle 19 is mounted on the forward end of the frame 10 in position to engage the forward end of the boat, indicated at 21 in dotted lines.

Mounted at the rear of the side frame members 11 and 12 are angle members 22 and 23, respectively, each of which is provided with a plurality of bolt holes 24. Mounted on each of the horizontal flanges of the angles 22 and 23 is a bracket assembly including a relatively short angle member 26 secured to the angle 22 or 23, as the case may be, by bolts 27, whereby it may be adjusted forwardly or rearwardly of the frame member. Secured to the depending flange 28 of the angle member 26 is a plate 29 having a rearwardly turned flange portion 31 which is secured to the depending flange portion 28 of the angle member 26 by any suitable means, as by welding. The two plates 29 are joined to each other by a transverse rod 32. Each plate 29 is provided with a plurality of bolt holes 33, as shown in Fig. 5.

Mounted on each of the plates 29, by means of bolts 34 passing through the holes 33 is a pad support member 36. Each pad support member 36 is provided with a plurality of bolt holes 37 whereby it may be raised or lowered with respect to the plate 29, or moved inwardly or outwardly, transversely of the frame to adjust it to boats of different sizes. Pivotally mounted in the upper end of each of the support members 36, by means of a bolt 38 is an elongated supporting pad 39. The pads 39 are disposed to engage the sides of the boat 21 from the rear forwardly, as shown in Fig. 2 of the drawing and being pivoted adapt themselves to the rake of the boat. It will also be seen that by the adjustments provided they may be adjusted to support the rear, or transom of the boat and adapt themselves to boats of different widths and sizes.

Pivotally mounted on the depending flange portion 28 of the flange member 26, on each side of the frame, by means of a bolt 41, is a plate 42. Extending transversely of the frame, with its ends welded to the plate 42 is a transverse bar, or pipe 43. Mounted on the pipe 43 and secured thereto by means of a stirrup 44 and welding is an elongated roller support bar 46 which extends longitudinally of the frame, midway between the side members 11 and 12. Mounted on the elongated roller support bar 46 are conical pairs of supporting rollers 47, 48, 49 and 51. The rollers 48 and 49 are mounted in brackets 52 and 53 which are rigidly joined to the roller support bar 46. The rearward roller 47 is mounted for rotation in brackets 50 and 55 which are secured to a plate 54 by means of bolts 56, which pass through vertical slots 57 and 58 in the brackets, whereby the roller is vertically adjustable with respect to the bar 45. The plate 54 is joined to the ends of the bar 46 by welding. The forward rollers 51 are mounted for rotation in brackets 59 and 61 which are mounted on the forward end of the roller support bar 46 by means of a bolt 62 which passes through vertical slots 63 in the brackets, as shown in Fig. 3 of the drawing.

Mounted on the draw bar 13 is a support 64 upon which is mounted the usual winch and cable assembly 66 which may be employed for pulling a boat up on the trailer.

Pivotally mounted to the roller support bar 46, adjacent the forward end thereof, is a rod 60 which passes through the depending flange 65 of the cross brace 14 and which is provided with spaced sleeves, or nuts 70 whereby to limit the angular movement of the roller support bar 46.

As is well known in the art to which my invention relates, when a boat trailer is being loaded or unloaded it is often pushed out into the water. To prevent the user of my improved trailer from getting into the water when loading or unloading a boat, I provide a walkway 71 which is mounted on the draw bar 13 and extends rearwardly to be secured to the forward end of the frame 10 and to the cross brace 14. A second walkway 72, disposed laterally of the frame 10, is mounted on the cross brace 14 and the cross brace 16. The provision of these walkways permits the user to walk out on the frame and guide the boat out on the water, or into its proper position to be towed out of the water.

From the foregoing it will be apparent that I have devised an improved boat trailer which is simple and sturdy of design and which embodies improved means for loading and unloading a boat and for the maximum support of the boat while it is being transported.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a boat trailer embodying a frame having longitudinally extending side members with supporting wheels rearwardly of the frame and a draw bar at the front, a longitudinally adjustable bracket assembly mounted on each side member, an elongated supporting pad mounted on each bracket assembly, a transverse bar mounted in the bracket assembly, a roller support bar extending longitudinally of the frame midway between the side members, means to support the roller support bar from the bracket assembly for pivotal movement in a vertical plane, a plurality of sets of rollers mounted in spaced relation on the roller support bar, a forward support pad adjacent the forward portion of the frame, and means to adjust the relative positions of the rollers vertically.

2. In a boat trailer embodying a frame having longitudinally extending side members with supporting wheels near the rear of the frame and a draw bar at the front, a bracket assembly mounted on each of the side members near the rear of the frame and adjustable longitudinally thereof, a pad support included in each of the bracket assemblies and adjustable transversely and vertically with respect to the frame, an elongated pad mounted on each of the pad supports, an elongated roller support disposed midway between the side members and mounted on a cross bar pivoted in the bracket assembly, a plurality of roller supports mounted in spaced relation on the roller support bar, and a support pad at the front of the frame.

3. A trailer as defined in claim 2 in which each of the elongated pads is pivotally mounted in its support.

4. A trailer as defined in claim 2 in which the roller supports at the front and rear of the roller support bar are adjustable vertically and in which means are provided to limit pivotal movement of the roller support bar.

5. A boat trailer as defined in claim 2 in which the side frame members are joined by rigid forward and rear transverse members, and in which a walkway is provided on the draw bar to extend rearwardly to the forward transverse member, and a second walkway is provided laterally of the frame and supported on the forward and rear transverse members.

No references cited.